United States Patent
Tseng

(10) Patent No.: US 10,866,887 B2
(45) Date of Patent: Dec. 15, 2020

(54) MEMORY MANAGEMENT METHOD, MEMORY STORAGE DEVICE AND MEMORY CONTROL CIRCUIT UNIT

(71) Applicant: PHISON ELECTRONICS CORP., Miaoli (TW)

(72) Inventor: Ming-Hui Tseng, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 162 days.

(21) Appl. No.: 16/100,207

(22) Filed: Aug. 10, 2018

(65) Prior Publication Data
US 2019/0391913 A1 Dec. 26, 2019

(30) Foreign Application Priority Data
Jun. 21, 2018 (TW) ............................. 107121279 A

(51) Int. Cl.
*G06F 12/00* (2006.01)
*G06F 12/02* (2006.01)
*G06F 13/16* (2006.01)
*G06F 3/06* (2006.01)

(52) U.S. Cl.
CPC ........ *G06F 12/0238* (2013.01); *G06F 3/0679* (2013.01); *G06F 13/1668* (2013.01)

(58) Field of Classification Search
CPC . G06F 12/0238; G06F 13/1668; G06F 3/0679
See application file for complete search history.

(56) References Cited

U.S. PATENT DOCUMENTS 6,032,178 A * 2/2000 Bacigalupo ........... G06F 13/364
709/200
2008/0082700 A1* 4/2008 Ogawa .................... G06F 13/24
710/5

FOREIGN PATENT DOCUMENTS

TW 201222256 6/2012
TW 201721653 6/2017

OTHER PUBLICATIONS

"Office Action of Taiwan Counterpart Application," dated Mar. 12, 2019, p. 1-p. 5.

* cited by examiner

*Primary Examiner* — Arvind Talukdar
(74) *Attorney, Agent, or Firm* — JCIPRNET

(57) ABSTRACT

A memory management method for a memory storage device including a rewritable non-volatile memory module is provided according to an exemplary embodiment of the disclosure. The method includes: receiving a first command and performing a first operation corresponding to the first command; transmitting a completion message to a host system corresponding to a completion of the first operation; detecting command processing information; determining a transmission mode of an interruption message according to the command processing information; and transmitting the interruption message to the host system according to the transmission mode.

36 Claims, 7 Drawing Sheets

MEMORY MANAGEMENT METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 107121279, filed on Jun. 21, 2018. The entirety of the above-mentioned patent application is hereby incorporated by reference herein and made a part of this specification.

BACKGROUND

Technical Field

The disclosure relates to a memory technology, and more particularly, to a memory management method, a memory storage device and a memory control circuit unit.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

Based on a non-volatile memory host controller interface standard or an NVM express (NVMe) interface standard, a host system can execute a host command processing procedure to generate an operation command to be provided to a memory storage device. The memory storage device can actively obtain the operation command from the host system and perform a corresponding operation. After the corresponding operation is completed, the memory storage device can send one completion message and one interruption message to the host system. According to the interruption message, the host system can change an executing operation procedure from the host command processing procedure to a checking procedure, so as to interrupt a command generation task and start checking the received completion message. However, if the host system receives the interruption message too frequently, the host system would need to frequently switch between the host command processing procedure and the checking procedure, thereby increasing a system loading.

Certain memory storage devices are able to transmit the interruption message after a plurality of operation commands are completed or after a response timeout occurs, so as to reduce a frequency at which the host system switches between the host command processing procedure and the checking procedure. However, when a command queue depth is relatively shallow, the aforementioned mechanism can easily reduce a reaction efficiency of the entire storage system. For example, if the command queue depth is 1 to 8, the host system usually receives the completion message from the memory storage device after the response timeout occurs. In certain cases, if the host system cannot receive the interruption message in time, the host system may not be able to execute procedures in the next stage, thereby reducing a data processing performance of the host system.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The disclosure is directed to a memory management method, a memory storage device and a memory control circuit unit, which are capable of dynamically determining a transmission mode of an interruption message to solve aforesaid issues.

An exemplary embodiment of the disclosure provides a memory management method for a memory storage device having a rewritable non-volatile memory module. The memory management method includes: receiving a first command and performing a first operation corresponding to the first command; transmitting a completion message to a host system corresponding to a completion of the first operation; detecting command processing information; determining a transmission mode of an interruption message according to the command processing information; and transmitting the interruption message to the host system according to the transmission mode.

An exemplary embodiment of the disclosure further provides a memory storage device, which includes a connection interface unit, a rewritable non-volatile memory module and a memory control circuit unit. The connection interface unit is configured to couple to a host system. The memory control circuit unit is coupled to the connection interface unit and the rewritable non-volatile memory module. The memory control circuit unit is configured to receive a first command and perform a first operation corresponding to the first command. The memory control circuit unit is further configured to send a completion message to a host system corresponding to a completion of the first operation. The memory control circuit unit is further configured to detect command processing information. The memory control circuit unit is further configured to determine a transmission mode of an interruption message according to the command processing information. The memory control circuit unit is further configured to transmit the interruption message to the host system according to the transmission mode.

An exemplary embodiment of the disclosure further provides a memory control circuit unit, which is configured to control a rewritable non-volatile memory module. The memory control circuit unit includes a host interface, a memory interface, a detection circuit, an interruption circuit and a memory management circuit. The host interface is configured to couple to a host system. The memory interface is configured to couple to the rewritable non-volatile memory module. The memory management circuit is coupled to the host interface, the memory interface, the detection circuit and the interruption circuit. The memory management circuit is configured to receive a first command and perform a first operation corresponding to the first command. The memory management circuit is further configured to send a completion message to the host system corresponding to a completion of the first operation. The detection circuit is configured to detect the command processing information. The memory management circuit is further configured to determine a transmission mode of an interruption message according to the command processing information. The memory management circuit is further configured to instruct the interruption control circuit to transmit the interruption message to the host system according to the transmission mode.

Based on the above, after the first command is received and the first operation is performed corresponding to the first command, one completion message may be transmitted to the host system. Meanwhile, the transmission mode of an interruption message may be determined according to the command processing information. The interruption message may be transmitted to the host system according to the determined transmission mode. By dynamically determining the transmission mode of the interruption message, regardless of whether the command queue depth is deep or shallow, the interruption message may be properly transmitted to the host system to avoid the response timeout or prevent the host system from switching between the host command processing procedure and the checking procedure too frequently.

To make the above features and advantages of the disclosure more comprehensible, several embodiments accompanied with drawings are described in detail as follows.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
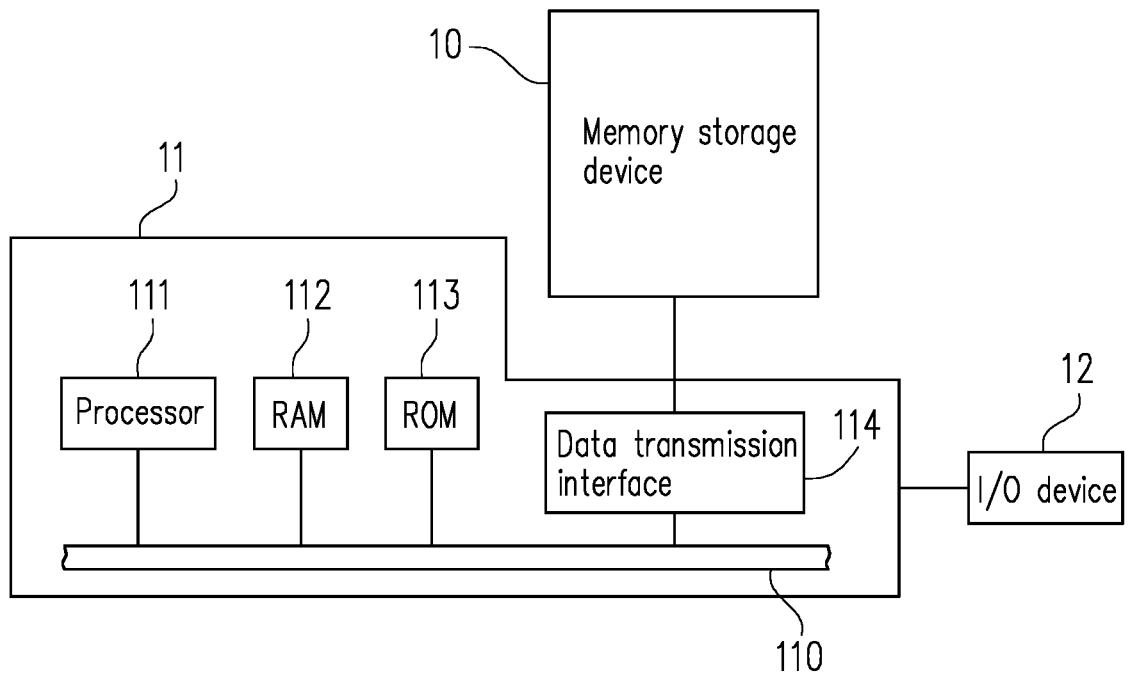
FIG. 1 is a schematic diagram illustrating a host system, a memory storage device and an I/O (input/output) device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
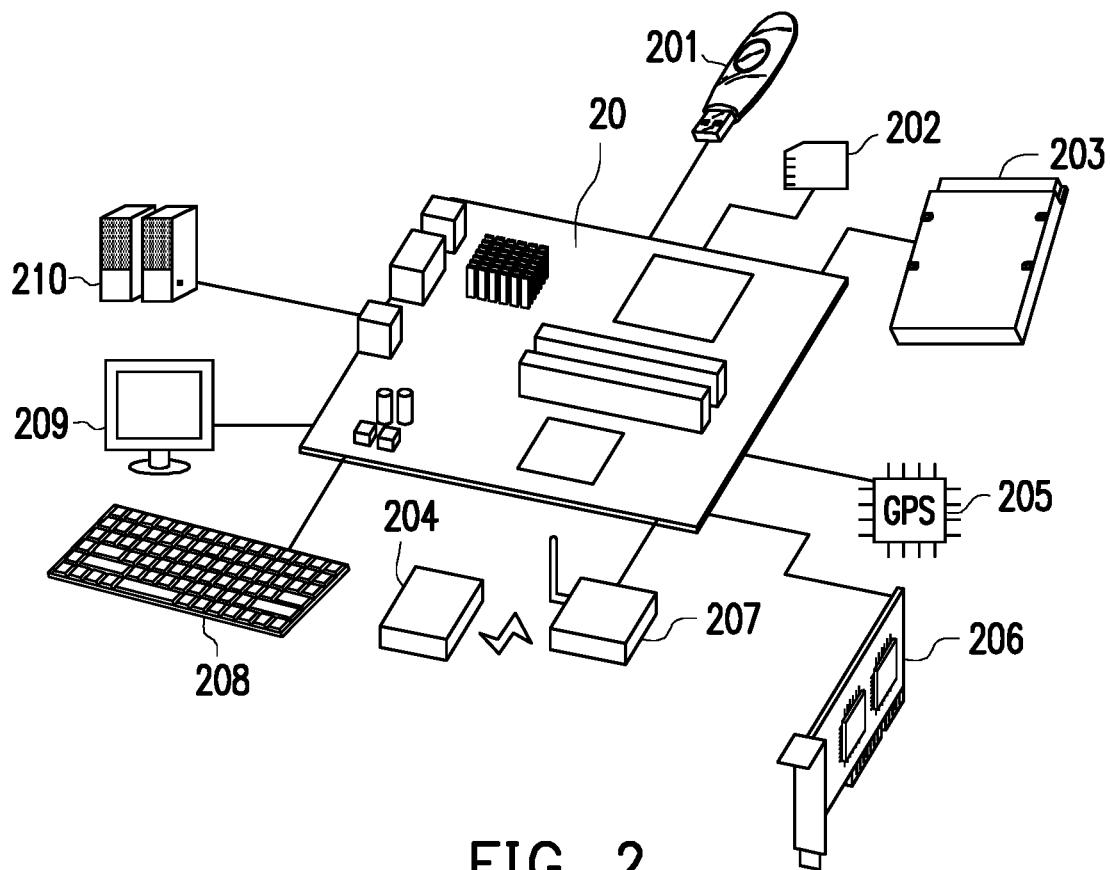
FIG. 2 is a schematic diagram illustrating a host system, a memory storage device and an I/O device according to another exemplary embodiment of the disclosure.

FIG. 1 is a schematic diagram illustrating a host system, a memory storage device and an I/O (input/output) device according to an exemplary embodiment of the disclosure. FIG. 2 is a schematic diagram illustrating a host system, a memory storage device and an I/O device according to another exemplary embodiment of the disclosure.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 through the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
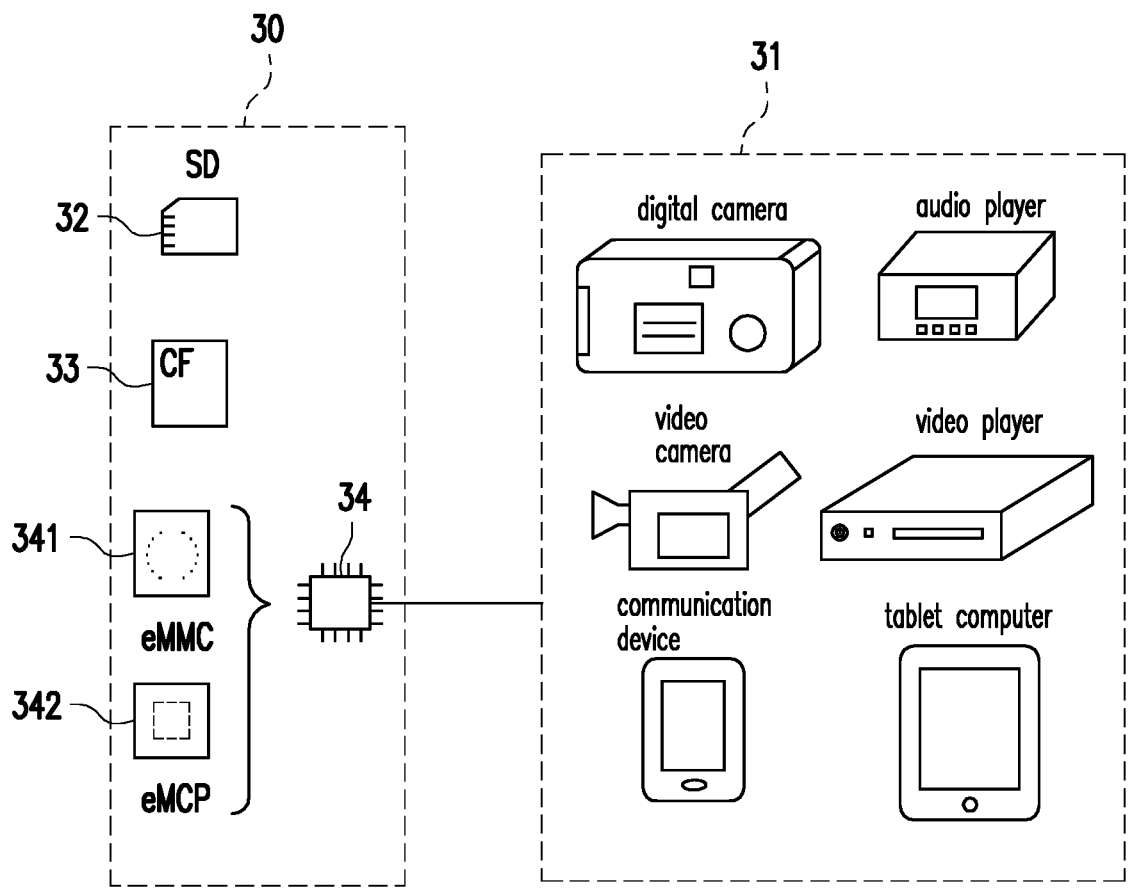
FIG. 3 is a schematic diagram illustrating a host system and a memory storage device according to another exemplary embodiment of the disclosure.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the disclosure. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system 31, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
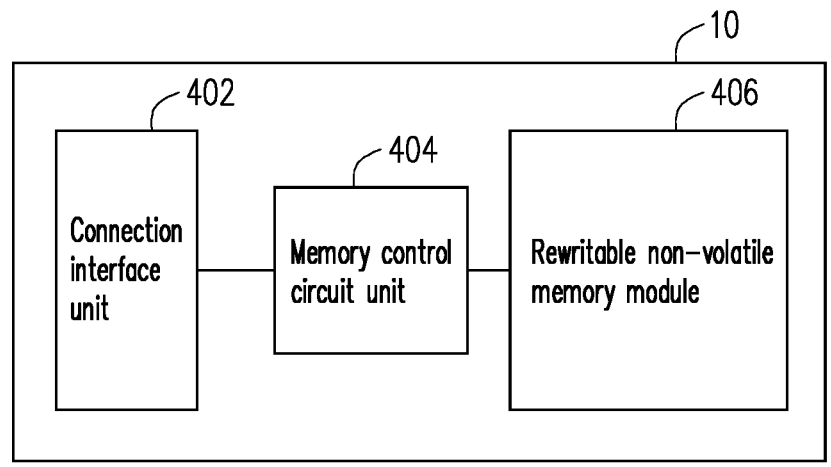
FIG. 4 is a schematic block diagram illustrating a memory storage device according to an exemplary embodiment of the disclosure.

FIG. 4 is a schematic block diagram illustrating a memory storage device according to an exemplary embodiment of the disclosure.

Referring to FIG. 4, the memory storage device 10 includes a connection interface unit 402, a memory control circuit unit 404 and a rewritable non-volatile memory module 406.

The connection interface unit 402 is configured to couple the memory storage device 10 to the host system 11. In this exemplary embodiment, the connection interface unit 402 is compatible with an NVM express (NVMe) interface standard. However, in another exemplary embodiment, the connection interface unit 402 may also be compatible with other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations, such as writing, reading or erasing data in the rewritable non-volatile memory module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". By changing the threshold voltage, each of the memory cells in the rewritable non-volatile memory module 406 can have a plurality of storage states. The storage state to which the memory cell belongs may be determined by applying a read voltage to the memory cell, so as to obtain the one or more bits stored in the memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store two or more bits, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. In general, in the MLC NAND flash memory, a writing speed of the lower physical programming unit is higher than a writing speed of the upper physical programming unit, and/or a reliability of the lower physical programming unit is higher than a reliability of the upper physical programming unit.

In the present exemplary embodiment, the physical programming unit is the minimum unit for programming. That is, the physical programming unit is the minimum unit for writing data. For example, the physical programming unit is a physical page or a physical sector. If the physical programming unit is the physical page, these physical programming units usually include a data bit area and a redundancy bit area. The data bit area includes multiple physical sectors configured to store user data, and the redundant bit area is configured to store system data (e.g., management data such as an error correcting code, etc.). In the present exemplary embodiment, the data bit area includes 32 physical sectors, and a size of each physical sector is 512 bytes (B). However, in other exemplary embodiments, the data bit area may also include 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
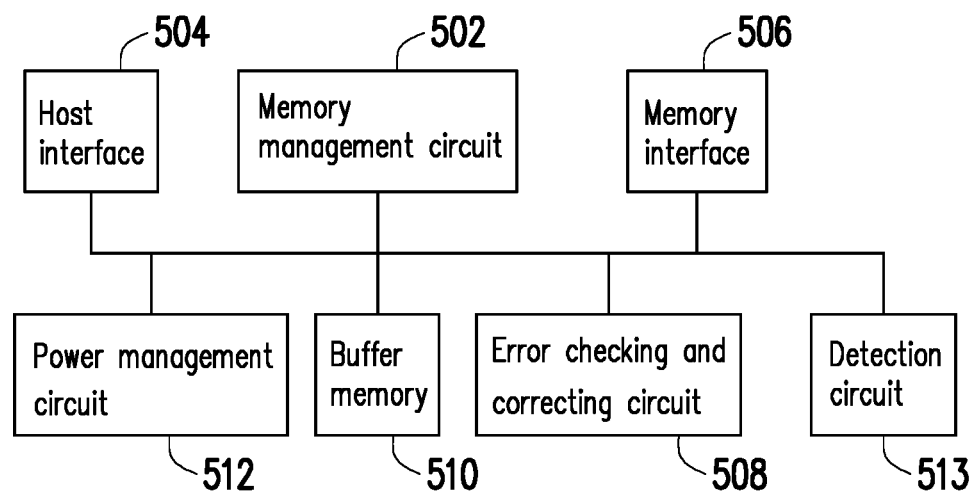
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 502 may also be stored as program codes in a specific area (for example, the system area in a memory dedicated for storing the system data) of the rewritable non-volatile memory module 406. In addition, the memory management circuit 502 has a microprocessor unit (not illustrated), the read only memory (not illustrated) and a random access memory (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations, such as writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to give a write command sequence for the rewritable non-volatile memory module 406 in order to write data into the rewritable non-volatile memory module 406. The memory reading circuit is configured to give a read command sequence for the rewritable non-volatile memory module 406 in order to read data from the rewritable non-volatile memory module 406. The memory erasing circuit is configured to give an erase command sequence for the rewritable non-volatile memory module 406 in order to erase data from the rewritable non-volatile memory module 406. The data processing circuit is configured to process both the data to be written into the rewritable non-volatile memory module 406 and the data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502 and configured to receive and identify commands and data sent from the host system 11. In other words, the commands and data transmitted by the host system 11 are transmitted to the memory management circuit 502 via the host interface 504. In this exemplary embodiment, the host interface 504 is compatible with the NVM express standard. Nevertheless, it should be understood that the disclosure is not limited in this regard. The host interface 504 may also be compatible with the SATA standard, the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). These command sequences are generated by the memory management circuit 502 and transmitted to the rewritable non-volatile memory module 406 through the memory interface 506, for example. The command sequences may include one or more signals, or data transmitted in the bus. The signals or the data may include command codes and program codes. For example, information such as identification codes and memory addresses are included in the read command sequence.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting operation to ensure the correctness of data. Specifically, when the memory management circuit 502 receives a write command from the host system 11, the error checking and correcting circuit 508 generates an ECC (error correcting code) and/or an EDC (error detecting code) for data corresponding to the write command, and the memory management circuit 502 writes data corresponding to the write command and the corresponding ECC and/or the EDC into the rewritable non-volatile memory module 406. Then, when the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

Figure 6:
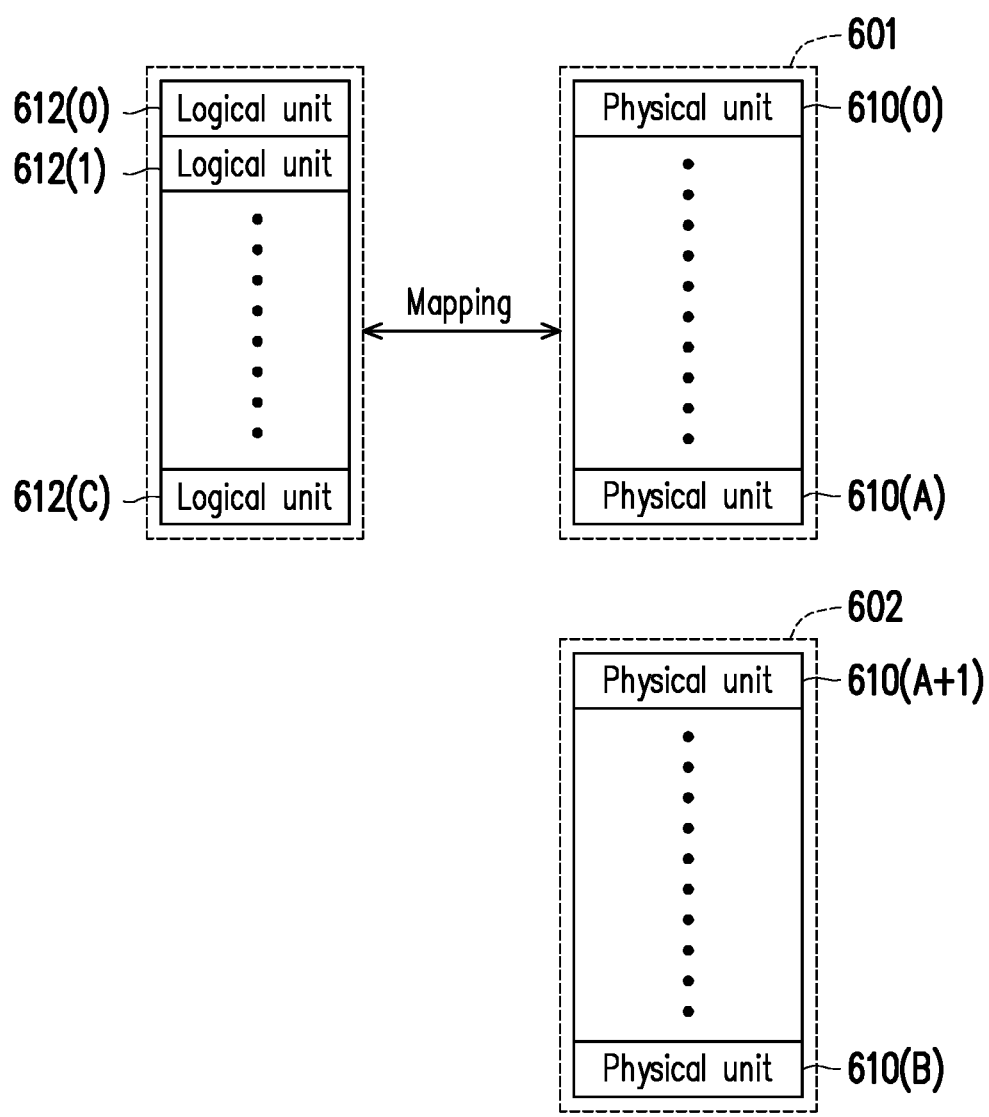
FIG. 6 is a schematic diagram illustrating management of a rewritable non-volatile memory module according to an exemplary embodiment of the disclosure.

FIG. 6 is a schematic diagram illustrating management of a rewritable non-volatile memory module according to an exemplary embodiment of the disclosure.

Referring to FIG. 6, the memory management circuit 502 logically groups physical units 610(0) to 610(B) of the rewritable non-volatile memory module 406 into a storage area 601 and a replacement area 602. The physical units 610(0) to 610(A) in the storage area 601 are configured to store data, and the physical units 610(A+1) to 610(B) in the replacement area 602 are configured to replace damaged physical units in the storage area 601. For example, if data read from one specific physical unit includes too many errors and these errors cannot be corrected, the specific physical unit is regarded as a damaged physical unit. It should be noted that, if there are no available physical erasing units in the replacement area 602, the memory management circuit 502 may declare the memory storage device 10 as in a write protect state so data can no longer be written thereto.

In the present exemplary embodiment, each physical unit refers to one physical erasing unit. However, in another exemplary embodiment, one physical unit may also refer to one physical address, one physical programming unit, or a composition of a plurality of continuous or discontinuous physical addresses. The memory management circuit 502 assigns logical units 612(0) to 612(C) for mapping to the physical units 610(0) to 610(A) in the storage area 601. In the present exemplary embodiment, each logical unit refers to one logical address. However, in another exemplary embodiment, each logical unit may also refer to one logical programming unit, one logical erasing unit or a composition of a plurality of continuous or discontinuous logical addresses. In addition, each of the logical units 612(0) to 612(C) may also be mapped to one or more physical units.

The memory management circuit 502 records a mapping relation (a.k.a. a logical-physical address mapping relation) between the logical units and the physical units into at least one logical-physical address mapping table. When the host system 11 intends to read the data from the memory storage device 10 or write the data into the memory storage device 10, the memory management circuit 502 can perform a data accessing operation on the memory storage device 10 according to the logical-physical address mapping table.

It is noted that in the following description, some terms may be replaced with corresponding abbreviations for ease of reading (see Table 1).

TABLE 1

| rewritable non-volatile memory module | RNVM module |
|---|---|
| memory management circuit | MMC |
| interruption control circuit | ICC |

Figure 7:
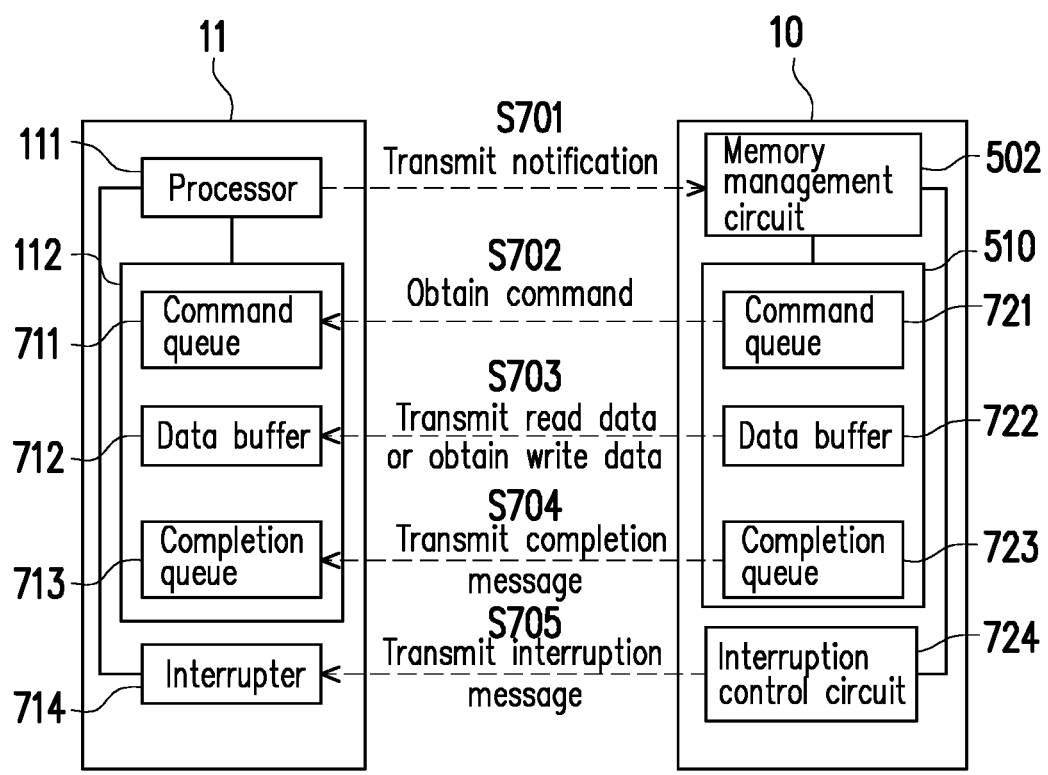
FIG. 7 is a schematic diagram illustrating a data transmitting operation according to an exemplary embodiment of the disclosure.

FIG. 7 is a schematic diagram illustrating a data transmitting operation according to an exemplary embodiment of the disclosure. A mechanism for communicating between the memory storage device 10 adopting the NVM express interface standard and the host system 11 is described below with FIG. 7 as an example.

With reference to FIG. 7, when the host system 11 intends to perform an access operation on the memory storage device 10 (e.g., reading data from the memory storage device 10 or writing data into the memory storage device 10), the processor 111 (e.g., CPU) of the host system 11 can execute one processing procedure (a.k.a. a host command processing procedure) to generate an operation command to be provided to the memory storage device 10. The processor 111 can place the prepared operation command into a command queue 711. Then, the processor 111 can transmit a notification to the memory storage device 10 (step S701).

In an exemplary embodiment, the operation of step S701 is also known as ringing. It should be noted that, in the NVM express interface standard, an active behavior of the host system 11 for the memory storage device 10 ends after the notification is sent.

The MMC 502 can receive such notification and actively reads one or more commands (a.k.a. a first command) corresponding to the notification from the command queue 711 (step S702). For example, the obtained command may be cached in a command queue 721. According to the command in the command queue 721, the MMC 502 can perform a corresponding access operation (a.k.a. a first operation). For example, according to a read command, the MMC 502 can perform a data reading operation on the RNVM module 406 and transmit the obtained read data from a data buffer 722 to the host system 11 (step S703). For example, the read data can be stored into a data buffer 712 of the host system 11. Alternatively, according to a write command, the MMC 502 can actively read write data from the data buffer 712 of the host system 11 and buffer the write data in the data buffer 722 (step S703). Subsequently, the MMC 502 can perform a data writing operation on the RNVM module 406 to write the write data cached in the data buffer 722 into the RNVM module 406.

The MMC 502 can generate one completion message corresponding to a completion of one access operation, and the completion message can be cached in a completion queue 723. The completion message is configured to notify the host system 11 that the access operation corresponding to one particular command has been completed. Then, the completion message can be transmitted to the host system 11 and cached in a completion queue 713 (step S704). According to the data in the completion queue 713, the host system 11 can know that a memory access operation corresponding to a particular operation command has been completed. Alternatively, in an exemplary embodiment, according to the data in the completion queue 713, the host system 11 can also obtain a data access quantity and a data access speed of the memory storage device 10 corresponding to one or more access commands.

In the exemplary embodiment of FIG. 7, the command queue 711, the data buffer 712 and the completion queue 713 are located in the RAM 112 of the host system 11, and the command queue 721, the data buffer 722 and the completion queue 723 are located in the buffer memory 510 of the memory storage device 10. Nonetheless, in another exemplary embodiment, any one of the command queue 711, the data buffer 712 and the completion queue 713 may also be located in other storage media of the host system 11, and any one of the command queue 721, the data buffer 722 and the completion queue 723 may also be located in other storage media (e.g., in the RNVM module 406) of the memory storage device 10.

In this exemplary embodiment, the host system 11 is further disposed with one interrupter 714, and the memory storage device 10 is further disposed with one ICC 724. The interrupter 714 is coupled to the processor 111, and the ICC 724 is coupled to the MMC 502. After at least one completion message is generated and/or transmitted, the ICC 724 transmits one interruption message to the interrupter 714 in the host system 11 (step S705). The interruption message is configured to interrupt the host command processing procedure of the host system 11. For example, the ICC 724 can transmit one interruption message (only) after the MMC 502 completes one or more operation commands or after a response timeout of the interruption message occurs. After receiving the interruption message, the interrupter 714 can transmit an interruption signal to the processor 111. According to the interruption signal, the processor 111 can change an executing operation procedure from the host command processing procedure previously used to generate the operation command to one checking procedure, so as to interrupt a command generation task and start checking the received completion message. After the checking procedure is completed, the processor 111 can switch back to execute the host command processing procedure again, so as to continue providing the operation command to the command queue 711.

It should be noted that, if the command queue 711 or 721 is currently in a high queue depth (e.g., a number of pending commands in the command queue 711 or 721 is between 9 and 127), in correspondence to multiple commands being continuously processed, the completion message and the interruption message are provided at a higher frequency. Yet, if the host system 11 receives the interruption message too frequently (i.e., the ICC 724 provide the interruption messages at an overly high frequency), the processor 111 would need to frequently switch between the host command processing procedure and the checking procedure, thereby increasing a system loading.

Alternatively, if the command queue 711 or 721 is currently in a low queue depth (e.g., the number of pending commands in the command queue 711 or 721 is between 1 and 8), in correspondence to lesser commands to be processed, the completion message and the interruption message are provided at a lower frequency. For example, in the low queue depth status, the ICC 724 may transmit one interruption message only until the response timeout of the interruption message occurs. Yet, if the host system 11 has not received the interruption message for too long (i.e., the ICC 724 provides the interruption message at an overly low frequency), the host system 11 may consider that the memory storage device 10 has not yet complete one particular access operation and thus temporarily stops executing other operations, thereby reducing a data processing speed of the host system 11 and/or the memory storage device 10.

In an exemplary embodiment, the MMC 502 can dynamically determine and/or adjust a transmission mode of the interruption message according to command processing information. The command processing information may include at least one of a number of received commands, a number of completed commands, a number of pending commands and an interruption message sending status. By dynamically determining and/or adjusting the transmission mode of the interruption message, regardless of whether the command queue 711 or 721 is currently in the high queue depth or the low queue depth, a balance may be achieved between increasing the system loading of the host system 11 and reducing the data processing speed of the host system 11 and/or the memory storage device 10. For example, if the command queue 711 or 721 is currently in the high queue depth, the MMC 502 can reduce a transmission frequency of the interruption message so as to reduce a frequency at which the host system 11 switches between the host command processing procedure and the checking procedure. Alternatively, if the command queue 711 or 721 is currently in the low queue depth, the MMC 502 can increase (or does not reduce) the transmission frequency of the interruption message so as to increase the data processing speed of the host system 11 and/or the memory storage device 10.

In an exemplary embodiment, the determined transmission mode may include a first mode and a second mode. The first mode corresponds to a first rule for transmitting the interruption message, the second mode corresponds to a second rule for transmitting the interruption message, and the first mode is different from the second mode. Based on different modes and/or rules, the MMC 502 can control a frequency at which the ICC 724 transmits the interruption message.

In an exemplary embodiment, the first rule is configured to reduce the transmission frequency of the interruption message. In an exemplary embodiment, the second rule is configured to increase (or not reduce) the transmission frequency of the interruption message or restore the transmission frequency of the interruption message back to a normal transmission frequency.

Referring to FIG. 5 and FIG. 7 together, in an exemplary embodiment, the memory control circuit unit 404 further includes a detection circuit 513. The detection circuit 513 is configured to detect the command processing information. In an exemplary embodiment, the detected command processing information include the number of pending commands in the command queue 711 or 721. For example, the detection circuit 513 can count a count value. If it is detected that one new command is added into the command queue 711 or 721, the detection circuit 513 can add one to the count value. By doing so, according to the count value, the detection circuit 513 can obtain the number of pending commands at the time and notify the MMC 502. In an exemplary embodiment, the detection circuit 513 can detect the number of received commands and the number of completed commands in the command queue 711 or 721. The detection circuit 513 can determine the number of pending commands according to a difference value between the number of received commands and the number of completed commands.

In an exemplary embodiment, the MMC 502 can determine the transmission mode according to whether the number of pending commands is greater than a threshold value (e.g., 8). For example, the MMC 502 can determine whether the number of pending commands is greater than said threshold value. If the number of pending commands is greater than said threshold value, the MMC 502 can set the transmission mode of the interruption message to the first mode. Alternatively, if the number of pending commands is not greater than said threshold value, the MMC 502 can set the transmission mode of the interruption message to the second mode. It should be noted that, the threshold value may also be other positive integers such as 7 or 9, which are not particularly limited by the disclosure.

In an exemplary embodiment, the MMC 502 can continuously count a number of the sent completion messages. Based on the first mode, the MMC 502 can instruct the ICC 724 to transmit the interruption message to the host system 11 after the number of the sent completion messages reaches a preset number. However, based on the second mode, the MMC 502 can instruct the ICC 724 to transmit the interruption message to the host system 11 before the number of the sent completion messages reaches the preset number.

In an exemplary embodiment, the MMC 502 can enable an interruption control mechanism (a.k.a. a first interruption control mechanism). The enabled first interruption control mechanism is configured to control the interruption message to be transmitted to the host system 11 after the number of the sent completion messages reaches the preset number. However, based on the second mode, the MMC 502 can disable (or does not enable) the first interruption control mechanism.

In an exemplary embodiment, after enabling the first interruption control mechanism, the MMC 502 counts the number of the sent completion messages in order to control the transmission of the interruption message. In an exemplary embodiment, in the case where the first interruption control mechanism is not enabled, the MMC 502 may not count the number of the sent completion messages.

Figure 8:
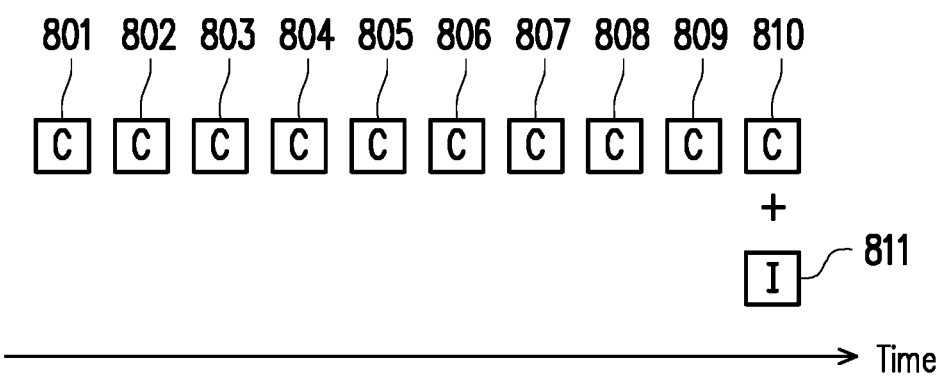
FIG. 8 is a schematic diagram illustrating transmission of the interruption message based on a first mode according to an exemplary embodiment of the disclosure.

FIG. 8 is a schematic diagram illustrating transmission of the interruption message based on a first mode according to an exemplary embodiment of the disclosure. Here, a horizontal axis direction represents time, and it is further assumed that the preset number is 10.

With reference to FIG. 7 and FIG. 8, in the first mode, completion messages 801 to 810 are sequentially transmitted to the host system 11. Each of the completion messages 801 to 810 corresponds to one executed operation command. In response to the number of the sent completion messages 801 to 810 (i.e., 10) that reaches the preset number, the MMC 502 can instruct the ICC 724 to transmit an interruption message 811 to the host system 11. In the first mode, the MMC 502 temporarily stops instructing the ICC 724 to transmit the interruption message 811 to the host system 11 before the completion message 810 is transmitted. Alternatively, from another perspective, based on the first mode, if the number of the sent completion messages does not reach the preset number, the MMC 502 would temporarily prohibit the ICC 724 to transmit the interruption message 811 to the host system 11 until all the completion message 801 to 810 are sent. In an exemplary embodiment of FIG. 8, whether to transmit the interruption message 811 or not is controlled by the enabled first interruption control mechanism. In addition, according to the interruption message 811, the processor 111 of the host system 11 can know that 10 commands respectively corresponding to the completion messages 801 to 810 have been executed.

Figure 9:
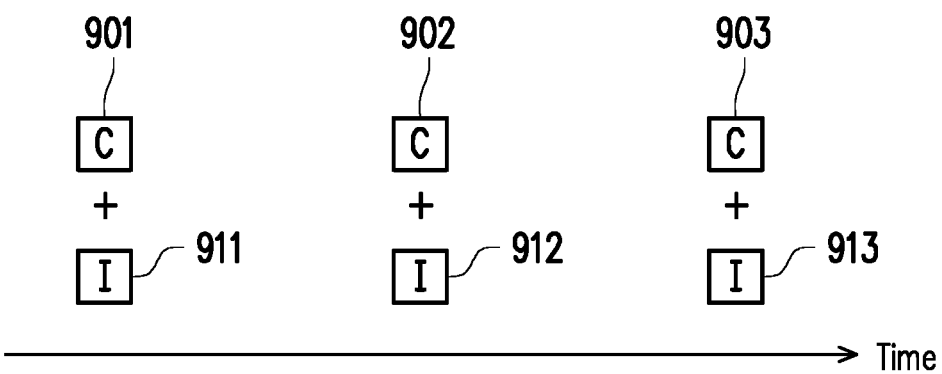
FIG. 9 is a schematic diagram illustrating transmission of the interruption message based on a second mode according to an exemplary embodiment of the disclosure.

FIG. 9 is a schematic diagram illustrating transmission of the interruption message based on a second mode according to an exemplary embodiment of the disclosure. Here, a horizontal axis direction represents time, and it is further assumed that the preset number is 10.

With reference to FIG. 7 and FIG. 9, based on the second mode, completion message 901 to 903 and the interruption messages 911 to 913 are sequentially transmitted to the host system 11. Each of the completion messages 901 to 903 corresponds to one executed operation command. The interruption messages 911 to 913 are transmitted respectively corresponding to the completion messages 901 to 903. That is to say, before the number of the sent completion messages 901 to 903 (i.e., 3) reaches the preset number (i.e., 10), the MMC 502 can instruct the ICC 724 to sequentially transmit the interruption messages 911 to 913 to the host system 11. In an exemplary embodiment of FIG. 9, since the first interruption control mechanism is not enabled, whether to transmit the interruption messages 911 to 913 or not is not controlled by the first interruption control mechanism. In addition, according to the interruption messages 911 to 913, the processor 111 of the host system 11 can know that 3 commands respectively corresponding to the completion messages 901 to 903 have been executed.

It should be noted that, although it is assumed that the preset number is 10 in the exemplary embodiments of FIG. 8 and FIG. 9, however, in other exemplary embodiments, the preset number may also be set to an integer greater than 1, such as 6 or 11. The disclosure is not limited in this regard.

In an exemplary embodiment of FIG. 8, according to a first number of the sent completion messages 801 to 810 (i.e., 10), the MMC 502 instructs the ICC 724 to transmit the interruption message 811 to the host system 11. In an exemplary embodiment of FIG. 9, according to a second number of the sent completion messages (i.e., 1, the completion message 901), the MMC 502 instructs the ICC 724 to transmit the interruption message 911 to the host system 11. In another exemplary embodiment, as long as the first number is greater than the second number, the first number and/or the second number may also be other integers greater than 1. For example, in another exemplary embodiment of FIG. 9, the interruption message 911 may also be transmitted to the host system 11 according to the two sent completion messages 901 and 902, and the interruption message 911 can notify the host system 11 that the commands respectively corresponding to the completion messages 901 and 902 have been executed.

In an exemplary embodiment, based on the first mode, the MMC 502 can instruct the ICC 724 to transmit the interruption message to the host system 11 after a count time reaches a preset time. For example, after transmitting one particular interruption message, the ICC 724 can activate a timer (or counter) to start timing. If the count time of the timer reaches the preset time (e.g., 1 second) and no interruption message is being transmitted within the preset time, the MMC 502 can instruct the ICC 724 to provide the interruption message(s) to the host system 11 according to one or more completion messages transmitted within the preset time. In this way, the response timeout of the interruption message may be avoided. However, in the second mode, the MMC 502 can instruct the ICC 724 to transmit the interruption message to the host system 11 before the count time reaches the preset time.

In an exemplary embodiment, the MMC 502 can enable another interruption control mechanism (a.k.a. a second interruption control mechanism) based on the first mode. The enabled second interruption control mechanism is configured to control the interruption message to be transmitted to the host system 11 after the count time reaches the preset time. However, based on the second mode, the MMC 502 can disable (or does not enable) the second interruption control mechanism.

In an exemplary embodiment, after the second interruption control mechanism is enabled, the ICC 724 activates the timer for timing and accordingly controls the transmission of the interruption message. In an exemplary embodiment, in the case where the second interruption control mechanism is not enabled, the MMC 502 may not activate the timer.

It should be noted that, the first interruption control mechanism and the second interruption control mechanism may be both enabled in the first mode. For example, in an exemplary embodiment of FIG. 8, it is assumed that the first interruption control mechanism and the second interruption control mechanism are both enabled, and the preset umber is 10. Based on the first mode, if only 9 completion messages 801 to 809 are accumulated and the count time, started when the completion message 801 is sent, already reaches the preset time (e.g., 1 second), even though the condition for sending the interruption message in the first interruption control mechanism (i.e., the number of the sent completion messages being greater than the preset number) is not yet satisfied, the interruption message 811 may still be sent to the host system 11 under control of the second interruption control mechanism to avoid the response timeout.

In an exemplary embodiment, it is also possible that the first interruption control mechanism and the second interruption control mechanism are both enabled in the first mode while the second interruption control mechanism is enabled but the first interruption control mechanism is not enabled in the second mode. In an exemplary embodiment, the transmission mode of the interruption message may also include more modes instead of only the first mode and the second mode described above.

In an exemplary embodiment, the interruption message sending status reflects a sending status or a sending mode of the interruption message within a preset time interval. For example, the interruption message sending status may include a sending record of the interruption messages. The MMC 502 can dynamically adjust the transmission mode of the interruption message according to the sending status or the sending mode of the interruption message within a past period of time (i.e., the preset time interval). For example, in an exemplary embodiment, if the interruption message sending status reflects a response timeout event of the interruption message that continuously occurs or occurs N times (N is greater than or equal to 1) within the preset time interval, the MMC 502 can switch the transmission mode of the interruption message from the first mode to the second mode. For example, in the first mode, if an event of sending the interruption message (i.e., the response timeout event of the interruption message) due to the condition for transmitting the interruption message in the second interruption control mechanism being satisfied (i.e., the count time reaches the preset time) continuously occurs or occurs N times within the preset time interval, the MMC 502 can switch the transmission mode of the interruption message to the second mode, so as to disable the first interruption control mechanism and/or the second interruption control mechanism.

Figure 10:
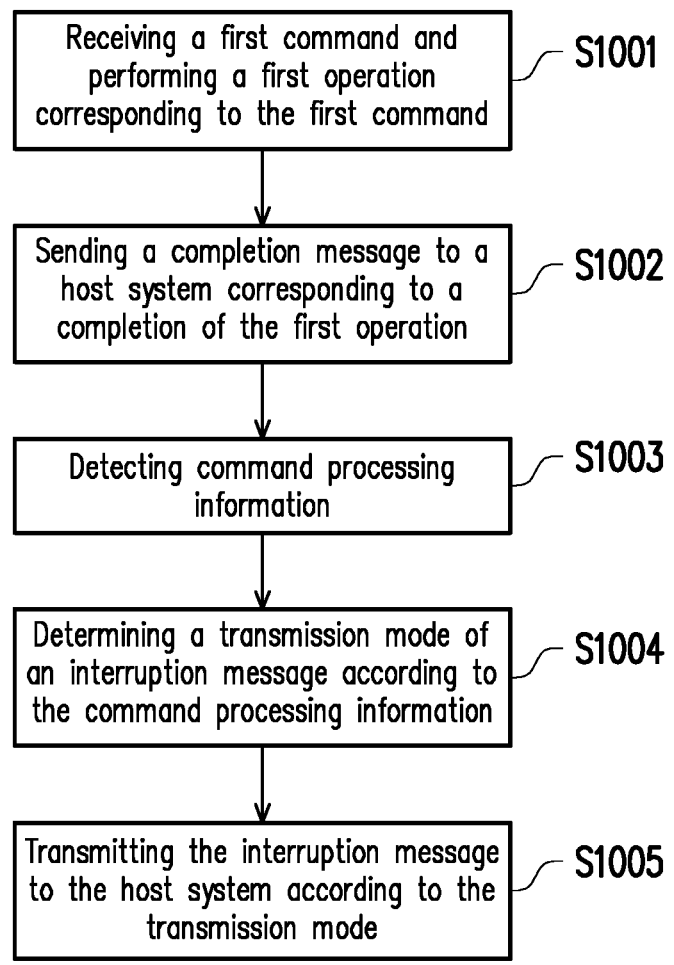
FIG. 10 is a flowchart illustrating a memory management method according to an exemplary embodiment of the disclosure.

FIG. 10 is a flowchart illustrating a memory management method according to an exemplary embodiment of the disclosure. With reference to FIG. 10, in step S1001, a first command is received and a first operation is performed corresponding to the first command. In step S1002, a completion message is transmitted to a host system corresponding to a completion of the first operation. In step S1003, command processing information is detected. In step S1004, a transmission mode of an interruption message is determined according to the command processing information. In step S1005, the interruption message is transmitted to the host system according to the transmission mode.

Nevertheless, steps depicted in FIG. 10 are described in detail as above so that related description thereof is omitted hereinafter. It should be noted that, the steps depicted in FIG. 10 may be implemented as a plurality of program codes or circuits, which are not particularly limited in the disclosure. Moreover, the method disclosed in FIG. 10 may be implemented by reference with above exemplary embodiments, or may be implemented separately, which are not particularly limited in the disclosure.

In summary, after the first command is received and the first operation is performed corresponding to the first command, one completion message may be transmitted to the host system. Meanwhile, the transmission mode of the interruption message may be determined according to the command processing information. The interruption message may be transmitted to the host system according to the determined transmission mode. By dynamically determining the transmission mode of the interruption message, regardless of whether the command queue depth is deep or shallow, the interruption message may be properly transmitted to the host system to avoid the response timeout or prevent the host system from switching between the host command processing procedure and the checking procedure too frequently.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory management method for a memory storage device comprising a rewritable non-volatile memory module, the memory management method comprising:
    receiving a first command and performing a first operation corresponding to the first command;
    sending a completion message to a host system corresponding to a completion of the first operation;
    detecting command processing information;
    determining a transmission mode of an interruption message according to the command processing information; and
    transmitting the interruption message to the host system according to the transmission mode,
    wherein the transmission mode comprises a first mode and a second mode, the first mode corresponds to a first rule for transmitting the interruption message, the second mode corresponds to a second rule for transmitting the interruption message, and the first rule is different from the second rule.

2. The memory management method of claim 1, wherein the interruption message is configured to interrupt a host command processing procedure of the host system.

3. The memory management method of claim 1, wherein the command processing information comprises at least one of a number of a received command, a number of a completed command, a number of a pending command and an interruption message sending status.

4. The memory management method of claim 3, wherein the step of detecting the command processing information comprises:
    determining the number of the pending command according to a difference value between the number of the received command and the number of the completed command.

5. The memory management method of claim 1, wherein the step of determining the transmission mode of the interruption message according to the command processing information comprises:
    determining the transmission mode according to whether a number of a pending command is greater than a threshold value.

6. The memory management method of claim 3, wherein the interruption message sending status reflects a sending status or a sending mode of the interruption message within a preset time interval,
    wherein the step of determining the transmission mode of the interruption message according to the command processing information comprises:
    if the interruption message sending status reflects a response timeout event of the interruption message that occurs N times within the preset time interval, switching the transmission mode of the interruption message from the first mode to the second mode, wherein N is a positive integer not less than 1.

7. The memory management method of claim 1, wherein the step of transmitting the interruption message to the host system according to the transmission mode comprises:
in the first mode, transmitting the interruption message to the host system after a number of a completion message being sent reaches a preset number; and
in the second mode, transmitting the interruption message to the host system before the number of the completion message being sent reaches the preset number, wherein the preset number is greater than 1.

8. The memory management method of claim 7, wherein the step of transmitting the interruption message to the host system according to the transmission mode further comprises:
in the first mode, enabling a first interruption control mechanism, wherein the enabled first interruption control mechanism is configured to control that the interruption message is transmitted to the host system after the number of the completion message being sent reaches the preset number; and
in the second mode, disabling the first interruption control mechanism.

9. The memory management method of claim 1, wherein the step of transmitting the interruption message to the host system according to the transmission mode comprises:
in the first mode, transmitting the interruption message to the host system after a count time reaches a preset time; and
in the second mode, transmitting the interruption message to the host system before the count time reaches the preset time.

10. The memory management method of claim 9, wherein the step of transmitting the interruption message to the host system according to the transmission mode further comprises:
in the first mode, enabling a second interruption control mechanism, wherein the enabled second interruption control mechanism is configured to control that the interruption message is transmitted to the host system after the count time reaches the preset time; and
in the second mode, disabling the second interruption control mechanism.

11. The memory management method of claim 1, wherein the step of transmitting the interruption message to the host system according to the transmission mode comprises:
in the first mode, transmitting the interruption message to the host system according to a first number of a completion message being sent; and
in the second mode, transmitting the interruption message to the host system according to a second number of the completion message being sent,
wherein the first number is greater than the second number.

12. The memory management method of claim 11, wherein the first number is an integer greater than 1, and the second number is 1.

13. A memory storage device, comprising:
a connection interface unit, configured to couple to a host system;
a rewritable non-volatile memory module; and
a memory control circuit unit, coupled to the connection interface unit and the rewritable non-volatile memory module,
wherein the memory control circuit unit is configured to receive a first command and perform a first operation corresponding to the first command,
wherein the memory control circuit unit is further configured to send a completion message to a host system corresponding to a completion of the first operation,
wherein the memory control circuit unit is further configured to detect command processing information,
wherein the memory control circuit unit is further configured to determine a transmission mode of an interruption message according to the command processing information,
wherein the memory control circuit unit is further configured to transmit the interruption message to the host system according to the transmission mode,
wherein the transmission mode comprises a first mode and a second mode, the first mode corresponds to a first rule for transmitting the interruption message, the second mode corresponds to a second rule for transmitting the interruption message, and the first rule is different from the second rule.

14. The memory storage device of claim 13, wherein the interruption message is configured to interrupt a host command processing procedure of the host system.

15. The memory storage device of claim 13, wherein the command processing information comprises at least one of a number of a received command, a number of a completed command, a number of a pending command and an interruption message sending status.

16. The memory storage device of claim 15, wherein the operation that the memory control circuit unit detects the command processing information comprises:
determining the number of the pending command according to a difference value between the number of the received command and the number of the completed command.

17. The memory storage device of claim 13, wherein the operation that the memory control circuit unit determines the transmission mode of the interruption message according to the command processing information comprises:
determining the transmission mode according to whether a number of a pending command is greater than a threshold value.

18. The memory storage device of claim 15, wherein the interruption message sending status reflects a sending status or a sending mode of the interruption message within a preset time interval,
wherein the operation that the memory control circuit unit determines the transmission mode of the interruption message according to the command processing information comprises:
if the interruption message sending status reflects a response timeout event of the interruption message that occurs N times within the preset time interval, switching the transmission mode of the interruption message from the first mode to the second mode, wherein N is a positive integer not less than 1.

19. The memory storage device of claim 13, wherein the operation that the memory control circuit unit transmits the interruption message to the host system according to the transmission mode comprises:
in the first mode, transmitting the interruption message to the host system after a number of a completion message being sent reaches a preset number; and
in the second mode, transmitting the interruption message to the host system before the number of the completion message being sent reaches the preset number,
wherein the preset number is greater than 1.

20. The memory storage device of claim 19, wherein the operation that the memory control circuit unit transmits the interruption message to the host system according to the transmission mode further comprises:
in the first mode, enabling a first interruption control mechanism, wherein the enabled first interruption control mechanism is configured to control that the interruption message is transmitted to the host system after the number of the sent completion messages reaches the preset number; and
in the second mode, disabling the first interruption control mechanism.

21. The memory storage device of claim 13, wherein the operation that the memory control circuit unit transmits the interruption message to the host system according to the transmission mode comprises:
in the first mode, transmitting the interruption message to the host system after a count time reaches a preset time; and
in the second mode, transmitting the interruption message to the host system before the count time reaches the preset time.

22. The memory storage device of claim 21, wherein the operation that the memory control circuit unit transmits the interruption message to the host system according to the transmission mode further comprises:
in the first mode, enabling a second interruption control mechanism, wherein the enabled second interruption control mechanism is configured to control that the interruption message is transmitted to the host system after the count time reaches the preset time; and
in the second mode, disabling the second interruption control mechanism.

23. The memory storage device of claim 13, wherein the operation that the memory control circuit unit transmits the interruption message to the host system according to the transmission mode comprises:
in the first mode, transmitting the interruption message to the host system according to a first number of a completion message being sent; and
in the second mode, transmitting the interruption message to the host system according to a second number of the completion message being sent,
wherein the first number is greater than the second number.

24. The memory storage device of claim 23, wherein the first number is an integer greater than 1, and the second number is 1.

25. A memory control circuit unit for controlling a rewritable non-volatile memory module, the memory control circuit unit comprising:
a host interface, configured to couple to a host system;
a memory interface, configured to couple to the rewritable non-volatile memory module;
a detection circuit;
an interruption control circuit; and
a memory management circuit, coupled to the host interface, the memory interface, the detection circuit and the interruption control circuit,
wherein the memory management circuit is configured to receive a first command and perform a first operation corresponding to the first command,
wherein the memory management circuit is further configured to send a completion message to the host system corresponding to a completion of the first operation,
wherein the detection circuit is configured to detect command processing information,
wherein the memory management circuit is further configured to determine a transmission mode of an interruption message according to the command processing information,
wherein the memory management circuit is further configured to instruct the interruption control circuit to transmit the interruption message to the host system according to the transmission mode,
wherein the transmission mode comprises a first mode and a second mode, the first mode corresponds to a first rule for transmitting the interruption message, the second mode corresponds to a second rule for transmitting the interruption message, and the first rule is different from the second rule.

26. The memory control circuit unit of claim 25, wherein the interruption message is configured to interrupt a host command processing procedure of the host system.

27. The memory control circuit unit of claim 25, wherein the command processing information comprises at least one of a number of a received command, a number of a completed command, a number of a pending command and an interruption message sending status.

28. The memory control circuit unit of claim 27, wherein the operation that the detection circuit detects the command processing information comprises:
determining the number of the pending command according to a difference value between the number of the received command and the number of the completed command.

29. The memory control circuit unit of claim 25, wherein the operation that the memory management circuit determines the transmission mode of the interruption message according to the command processing information comprises:
determining the transmission mode according to whether a number of a pending command is greater than a threshold value.

30. The memory control circuit unit of claim 27, wherein the interruption message sending status reflects a sending status or a sending mode of the interruption message within a preset time interval,
wherein the operation that the memory management circuit unit determines the transmission mode of the interruption message according to the command processing information comprises:
if the interruption message sending status reflects a response timeout event of the interruption message that occurs N times within the preset time interval, switching the transmission mode of the interruption message from the first mode to the second mode, wherein N is a positive integer not less than 1.

31. The memory control circuit unit of claim 25, wherein the operation that the memory management circuit instructs the interruption control circuit to transmit the interruption message to the host system according to the transmission mode comprises:
in the first mode, transmitting the interruption message to the host system after a number of a completion message being sent reaches a preset number; and
in the second mode, transmitting the interruption message to the host system before the number of the completion message being sent reaches the preset number,
wherein the preset number is greater than 1.

32. The memory control circuit unit of claim 31, wherein the operation that the memory management circuit instructs the interruption control circuit to transmit the interruption message to the host system according to the transmission mode further comprises:
- in the first mode, enabling a first interruption control mechanism, wherein the enabled first interruption control mechanism is configured to control that the interruption message is transmitted to the host system after the number of the sent completion messages reaches the preset number; and
- in the second mode, disabling the first interruption control mechanism.

33. The memory control circuit unit of claim 25, wherein the operation that the memory management circuit instructs the interruption control circuit to transmit the interruption message to the host system according to the transmission mode comprises:
- in the first mode, transmitting the interruption message to the host system after a count time reaches a preset time; and
- in the second mode, transmitting the interruption message to the host system before the count time reaches the preset time.

34. The memory control circuit unit of claim 33, wherein the operation that the memory management circuit instructs the interruption control circuit to transmit the interruption message to the host system according to the transmission mode further comprises:
- in the first mode, enabling a second interruption control mechanism, wherein the enabled second interruption control mechanism is configured to control that the interruption message is transmitted to the host system after the count time reaches the preset time; and
- in the second mode, disabling the second interruption control mechanism.

35. The memory control circuit unit of claim 25, wherein the operation that the memory management circuit instructs the interruption control circuit to transmit the interruption message to the host system according to the transmission mode comprises:
- in the first mode, transmitting the interruption message to the host system according to a first number of a completion message being sent; and
- in the second mode, transmitting the interruption message to the host system according to a second number of the completion message being sent,
- wherein the first number is greater than the second number.

36. The memory control circuit unit of claim 35, wherein the first number is an integer greater than 1, and the second number is 1.

* * * * *